(12) United States Patent
Mainardis et al.

(10) Patent No.: US 7,128,860 B2
(45) Date of Patent: Oct. 31, 2006

(54) PRODUCTION OF COMPOSITE INSULATORS BY INJECTING DIFFERENT SCREENS ONTO AN INSULATOR SHANK

(75) Inventors: Rene Mainardis, Selb (DE); Michael Braune, Wunsiedel (DE)

(73) Assignee: Lapp Insulator GmbH & Co. KG., Wunsiedel (DE)

( * ) Notice: Subject to any disclaimer, the term of this patent is extended or adjusted under 35 U.S.C. 154(b) by 460 days.

(21) Appl. No.: 10/398,668

(22) PCT Filed: Oct. 12, 2001

(86) PCT No.: PCT/EP01/11810

§ 371 (c)(1),
(2), (4) Date: Jul. 10, 2003

(87) PCT Pub. No.: WO02/31838

PCT Pub. Date: Apr. 18, 2002

(65) Prior Publication Data

US 2004/0046276 A1 Mar. 11, 2004

(30) Foreign Application Priority Data

Oct. 13, 2000 (DE) ............... 100 50 879
Dec. 16, 2000 (DE) ............... 100 62 870

(51) Int. Cl.
*B29C 45/14* (2006.01)
(52) U.S. Cl. .............. 264/167; 264/171.13; 264/328.7; 264/254; 264/279; 425/122; 425/127
(58) Field of Classification Search ...... None
See application file for complete search history.

(56) References Cited

U.S. PATENT DOCUMENTS

| 3,922,503 | A | * | 11/1975 | Tabuchi ............... 381/408 |
| 3,928,519 | A | * | 12/1975 | Kashiyama et al. ...... 264/40.7 |
| 4,045,604 | A | * | 8/1977 | Clabburn ............ 428/35.1 |
| 4,337,019 | A | * | 6/1982 | Comte et al. ......... 425/116 |
| 4,373,113 | A | * | 2/1983 | Winkler et al. ........ 174/179 |
| 4,865,797 | A | * | 9/1989 | Jarvenkyla ........... 264/508 |
| 5,484,564 | A | * | 1/1996 | Goto ................. 264/219 |
| 5,612,069 | A | * | 3/1997 | Goto ................. 425/577 |

(Continued)

FOREIGN PATENT DOCUMENTS

DE 198 58 215 A 6/2000

(Continued)

*Primary Examiner*—Mark Eashoo
(74) *Attorney, Agent, or Firm*—Fulbright & Jaworski L.L.P.

(57) ABSTRACT

The invention relates to the production of composite insulators consisting of a shank in the form of a bar or a tube, which is provided with a covering and which comprises plate-like screens which are distanced from each other. The covering and the screens are made of an elastomer material with high insulating qualities. As a result, the number, distance, form and size of the screens can vary from insulator to insulator. According to the invention, at least one injection mould (10*a*, 10*b*, 11*a*, 11*b*, 12*a*, 12*b*, 13*a*, 13*b*) for injecting a screen (2, 3, 4, 5, 19, 20, 21, 22) is arranged downstream from a device which is used to provide the shank (1) with a covering. The injection mould can be advanced in order to inject a screen upon the shank and opened in order to unmould said screen. An advancing device is also provided in order to displace (16) the shank (1) or the screen mould. Each time the shank (1) or the screen mould is displaced, the position of the latter with respect to the shank enables a subsequent screen to be injected.

32 Claims, 2 Drawing Sheets

U.S. PATENT DOCUMENTS

Figure 1:
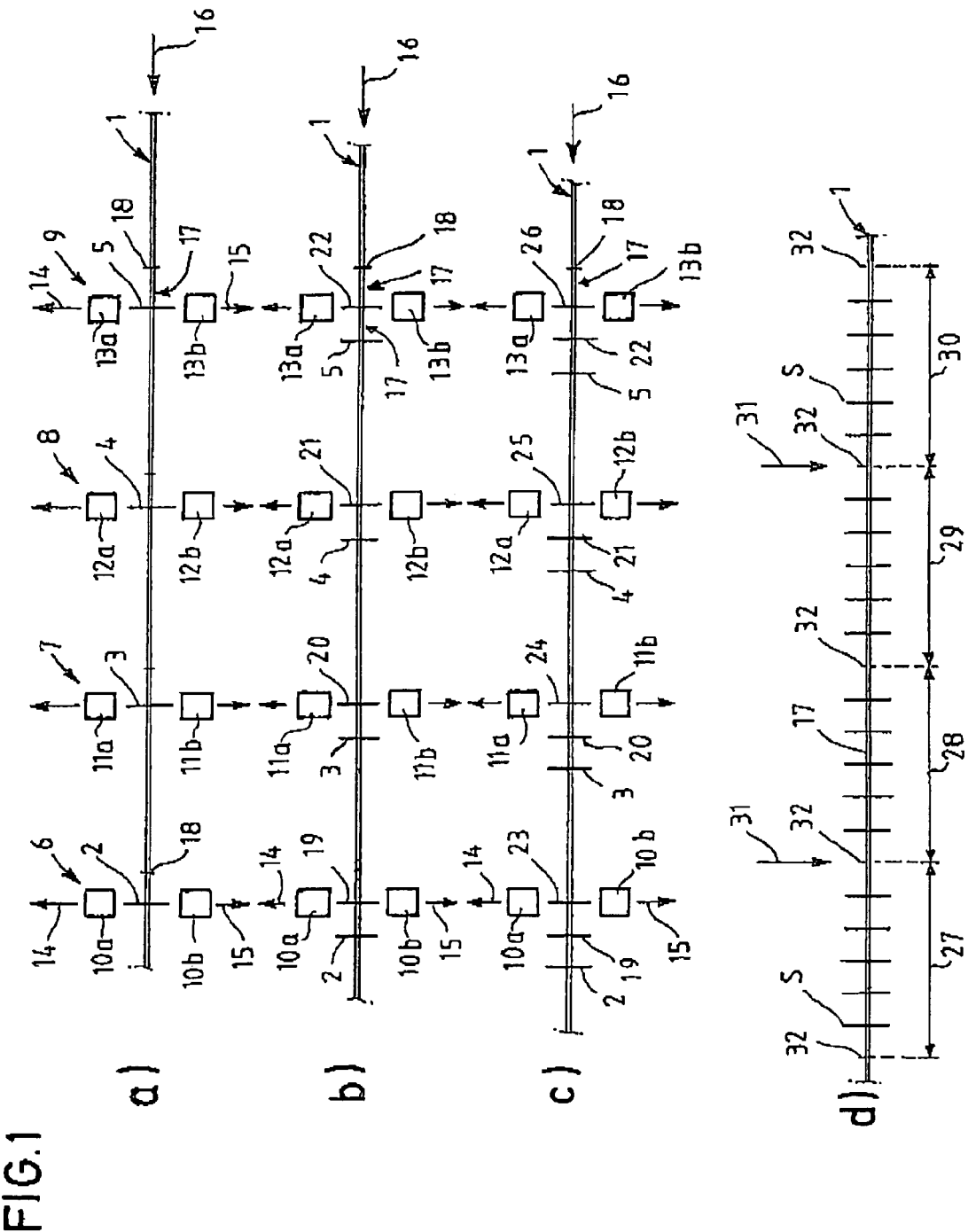

| | | | |
|---|---|---|---|
| 5,702,731 A * | 12/1997 | Hayakawa et al. | 425/125 |
| 5,753,272 A * | 5/1998 | Kashiwagi | 425/116 |
| 5,877,453 A * | 3/1999 | Hill | 174/179 |
| 5,902,963 A * | 5/1999 | Chappaz et al. | 174/167 |
| 5,925,855 A * | 7/1999 | Denndorfer | 174/179 |
| 6,015,796 A * | 1/2000 | Suzuki et al. | 514/45 |
| 6,379,602 B1 * | 4/2002 | Marumasu | 264/275 |
| 6,565,785 B1 * | 5/2003 | Ishikawa | 264/166 |
| 6,790,399 B1 * | 9/2004 | Fujii | 264/254 |

FOREIGN PATENT DOCUMENTS

| | | |
|---|---|---|
| DE | 199 44 513 C | 1/2001 |

* cited by examiner

PRODUCTION OF COMPOSITE INSULATORS BY INJECTING DIFFERENT SCREENS ONTO AN INSULATOR SHANK

This invention relates to a method for producing composite insulators and to a device for producing composite insulators.

Compared with the conventional insulators manufactured homogeneously from the material ceramic or glass, composite insulators consist of two components of different materials. The shank of the composite insulators consists of rods or tubes, generally made of epoxy resin reinforced with glass fibres. The shank may be fully coated with a cover, on which a number of mutually spaced, plate-like screens are fitted. Instead of plate-like screens, it is also possible for one or more helical screens to enclose the shank. The cover and the screens consist of a material with high insulation properties. Materials with these properties are elastomer materials, for example polymer plastics, which also include HTC silicones (HTC: high-temperature crosslinking).

Composite insulators are generally produced by preparing the screens individually and then fitting the required number of them onto a shank coated with extrudate and vulcanising them with the coat, as is known from DE 35 07 509 A1, or by centrally placing a rod with a predetermined number of screens in a two-part mould and injecting all the screens at once. The latter method, which is known from DE 42 02 653 A1, has the disadvantage that only an insulator with a fixed number of screens in a set configuration and with a set spacing can be manufactured with such a mould. DE 198 58 215 A1 discloses a method and a device with which it is possible to enclose a core, the shank, with a-cover and screen encasing in one working step.

It is an object of the present invention to allow production of composite insulators wherein the number, the spacing-as well as shape and size of the screens can be varied from insulator to insulator or within the same insulator.

The object is achieved according to the invention in that a cover is applied onto a shank of a composite insulator in the form of a rod or tube, and in that an injection mould, the screen mould, is then placed on to inject a respective screen. After a screen has been injected onto the shank, and after the material has cured, the screen mould is opened to release the screen and moved away from the shank. To inject a subsequent screen, the shank with the screen already injected is displaced until the screen mould can be placed on the shank in the position where the next screen is to be injected onto it. Alternatively, the screen mould may also be displaced in the axial direction of the shank until the position in which the next screen is intended to be injected onto the shank is reached.

For producing composite insulators which have a larger number of screens, a plurality of screen moulds may also be arranged one behind the other. The screen moulds may be delivered to the shank simultaneously to inject all the screens. It is however, also possible for the screen moulds for injecting the screens to be delivered to the shank successively or with an arbitrary time lag.

In another configuration of the invention, a plurality of screen moulds are arranged behind one another at a spacing which corresponds roughly to the length of a composite insulator to be produced. These screen moulds can likewise be delivered to the shank simultaneously. In this case, a plurality of insulators are produced simultaneously in one injection cycle, one screen being respectively injected onto the shank for each insulator.

In these insulators, the distances from the simultaneously injected screens to the previous screens closest to them are equal.

In a further configuration of the last method variant, instead of respectively only one screen mould for respectively producing only one composite insulator, it is also possible to provide a plurality of screen moulds arranged behind one another, by means of which a plurality of screens of the respective insulators are injected simultaneously in each injection cycle.

In both described methods, substantially more rational and faster production of composite insulators takes place than in the known methods. The number of screen moulds is, depending on the purpose, preferably between two and ten. Depending on the size and number, either the screen moulds are arranged separately each on one injection-moulding machine or a plurality of screen moulds are simultaneously connected to one machine.

The invention makes it possible to produce very different composite insulators in succession straightforwardly. If the spacing of the screens is to be altered, the spacing of the screens on the insulators may be varied by varying the forward-feed of the shank in the case of a single screen mould. If a plurality of screen moulds are provided for injecting screens simultaneously, the distance of the screen moulds from one another may be varied. Since such a change is in fact possible after each injection cycle, the spacing of the screens can actually be adjusted very differently on a single insulator.

The opportunity to change the number of screen moulds after each injection cycle is advantageous when a plurality of screens of an insulator are injected simultaneously with a plurality of screen moulds arranged behind one another, but the total number of screens to be injected requires that the insulator should overall carry one or more screens fewer than would be produced with the intended multiple of injection cycles. Then, the number of screen moulds may be adapted to the sum of the total number of screens before the last injection cycle.

The invention furthermore makes it possible to produce composite insulators with screens of different configuration, for example with smooth screen undersides or with grooves to lengthen the creep path on the underside. Formation of screen moulds for screens with a different configuration is possible not only for producing successive insulators, but actually after each injection cycle. Screens with a different configuration can therefore even be injected on the same insulators.

The diameter of the screens can also be altered by changing the screen moulds. This change is likewise possible after each injection cycle, so that a single insulator may have screens of different size. For particular applications, for example to protect against icing, it is advantageous for-a screen with a larger diameter to be arranged over screens with a smaller diameter on the same insulator.

The invention furthermore makes it possible to change the formation of the screens by changing screen moulds for screen moulds both with a different screen diameter and with a different screen configuration. These changes can be carried out both for successive insulators and in the formation of the screens for a single insulator. The latter likewise leads to a sequence of different screens on the same insulator.

It is necessary to open the screen moulds to release the screens. Especially for screens with small diameters and smooth screen surfaces, it is sufficient for the screen moulds to be divided in a plane through the shank axis. For screens with a larger diameter and therefore a larger volume, and in particular with structures for lengthening the creep path on the surfaces, releasability of the screens is possible only if the screen moulds can be divided both in the screen plane and in a plane through the shank axis. Division in the screen plane leads to two screen-mould halves, one for the top of the screen and one for the bottom of the screen, which are again divided into two parts through the plane through the shank axis. The mould halves divided in the plane through the shank axis are arranged on the right and on the left next to the shank, and they are put onto the shank and enclose it to inject the screens. The screen material is then injected. After it has cured, the screen halves are first moved away from one other in the screen plane itself in opposite directions along the shank axis to free the screen, and then removed from the shank perpendicularly to the shank axis.

Before injecting the screens, the shank is provided with a coat, a cover, of the same material or a comparable material as the one from which the screens are made, advantageously HTC silicones. The cover and the screens therefore form a homogeneous coat, which advantageously consists of only one material, on the shank.

To improve the bondability of the screens on the shank, the coat on the shank may be mechanically pretreated, for example roughened using brushes. In addition to the mechanical pretreatment, or instead of it, it is possible to apply an adhesion promoter, advantageously a silane.

In another device according to the invention, the screen moulds move with the shank during its forward feed. The shank may be advanced in cycles or continuously. For this purpose, the rods or tubes are bonded together to form an endless shank. This is-then forced through an extruder where a cover, a coat, of the screen material is applied to it. Behind the extruder, the screen moulds for the screens are placed on the shank. The halves of the screen moulds may, for example, respectively be arranged on an endless revolving chain, the chains being arranged parallel on the right and on the left of the shank, and moving with it at the same speed. On the side facing the shank, the chains with the closed screen moulds form the so-called moulding section. When the screen-mould halves assembled by the chains are closed, depending on the screen-mould size and the number of screen moulds, one or more injection-moulding machines are attached and the screen moulds are filled. The screen moulds then move through the moulding section to cool the screens. To release the screens, it is sufficient if, for small screens with a small diameter and without contours to lengthen the creep path, the partition plane lies in a plane through the mid-line of the shank. Especially for screens with contours to lengthen the creep path on their surface, however, it is advantageous for the screen moulds to be divided not only in the plane through the shank axis, but also once more in the screen plane. Only then is release of screens with this configuration possible. The halves of the screen mould for the tops and bottoms of the screens are divided once more through the plane through the mid-line of the shank. These parts are respectively arranged on the chains arranged on the right and on the left parallel to the shank, which are likewise mutually parallel. Release of the screens in this embodiment takes place similarly to release of the screens with the screen moulds arranged spatially fixed. However, as a function of screen size and screen spacing, it may be necessary for the parts of the screen-mould halves on the chains after release to be tilted sideways out of the transport direction of the resulting insulator, so that they do not hit the screens when they make a tilting movement forward because of the deflection of the chains.

After each opening of a screen mould at the end of the moulding section for injecting the screens, a new screen mould may be placed on the shank of the insulator at its start. On the other side of the chain from the shank, the screen moulds may then be changed for screen moulds with a different screen diameter or a different configuration. The number of screen moulds and/or their mutual spacing may furthermore be varied.

The invention makes it possible to produce insulators with screens of different size in different configurations at different distances from on another, without requiring an expensive stock of screen moulds. This differentiation of the screens is actually possible in a single insulator. It is furthermore conceivable for the material of the screens to be changed by changing the injection-moulding machine, in order to tailor the material optimally to the requirements made of the screens. If a plurality of injection-moulding machines are provided, they may contain different material, so that screens of different materials can be injected onto the same shank in alternation.

For an exemplary embodiment corresponding to the method according to the invention, the following parameters were set: A screen of 152 mm diameter is injected onto a 16 mm rod-shaped shank of GFP (glass-fibre-reinforced plastic) with a 3 mm cover of extrudate made of an HTC silicone comparable to the screen material at a mould temperature of 180° C. With a material temperature of 80° C., the injection time, depending on the material, is up to 20 seconds. The crosslinking time varies, likewise as a function of the material, between 30 and 270 seconds.

The invention will be explained in more detail with reference to exemplary embodiments.

Figure 2:
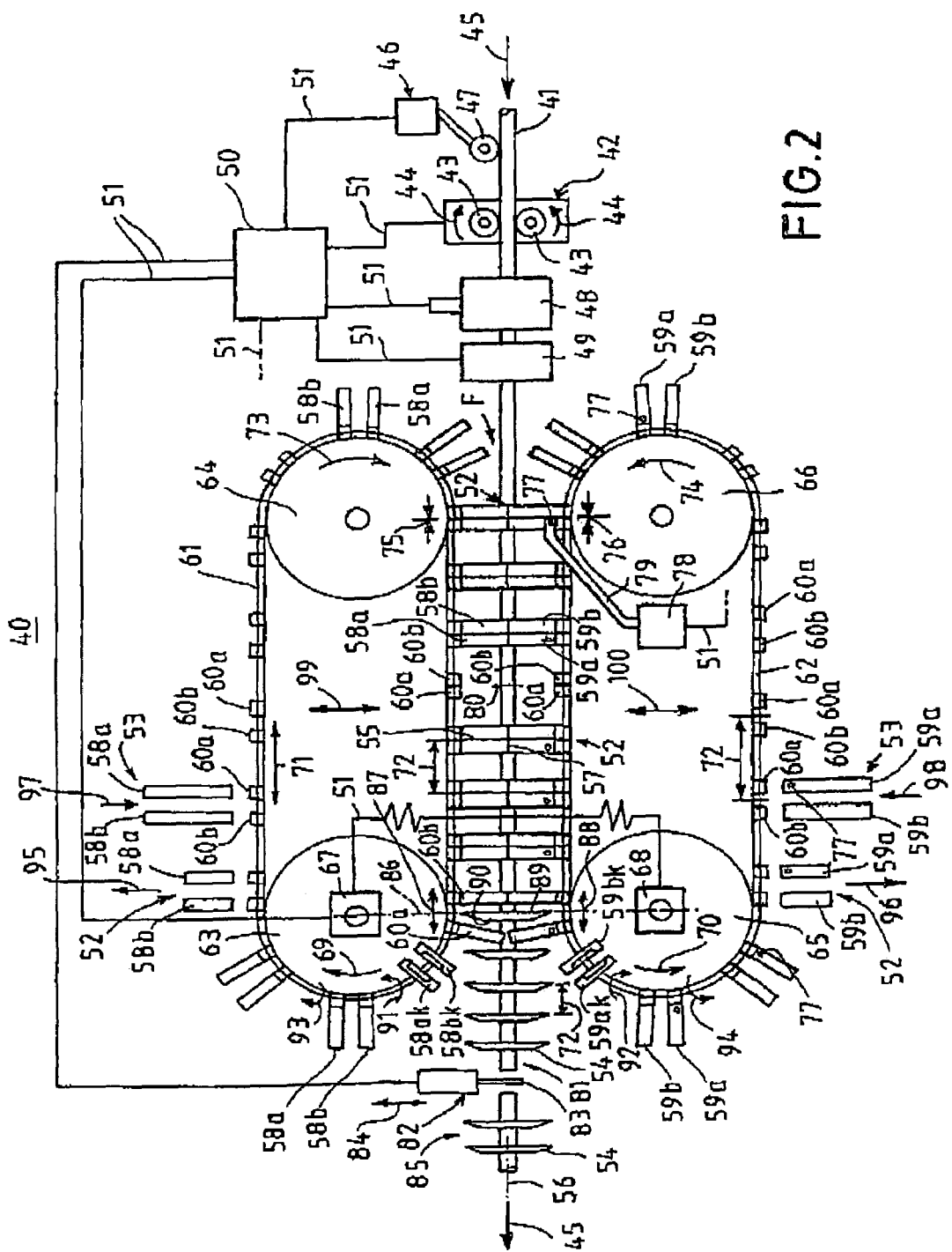

FIGS. 1a to 1d show the production of composite insulators with four stationary screen moulds, and FIG. 2 shows the production of composite insulators with screen moulds which move with the shank in the forward-feed cycle.

The production of composite insulators according to an exemplary embodiment of the method according to the invention is explained schematically in FIG. 1 in four production steps.

A shank 1, also referred to as the centre or core of the insulator, already carries in FIG. 1a four screens 2, 3, 4 and 5, which have been moulded in four mutually spaced screen moulds 6 to 9. In the present exemplary embodiment, four composite insulators are produced simultaneously. Each of the four screen moulds 6 to 9 in this case undertakes the production of one composite insulator. Its length is limited by the distances of the screen moulds from one another. The screens 2, 3, 4 and 5 have been injected onto the shank 1, which was previously coated with a cover of an HTC silicone in an apparatus not shown here. The respective mould halves 10a and 10b of the screen mould 6, 11a and 11b of the screen mould 7, 12a and 12b of the screen mould 8 and 13a and 13b of the screen mould 9 have respectively been moved away from the shank 1 in the direction of the arrows 14 and 15, respectively in the respective screen plane, in order to release and free the screens. The four screen moulds 6 to 9 may, depending on the size and spacing of the screens to be moulded, be arranged on the same injection-moulding machine or respectively on a separate injection-moulding machine.

After releasing the screens, the shank 1 is moved in the arrow direction 16 over a distance 17, the distance of the screens from one another, until the position 18 at which the next screen is intended to be injected faces the screen moulds 6, 7, 8 and 9. FIG. 1b shows the shank 1 after injecting the subsequent second screen 19, 20, 21 and 22, respectively. Here again, the situation after releasing the screens is represented.

To inject the subsequent third screen, the shank is displaced in the arrow direction 16 through the distance 17 between two screens, which is fixed in the present exemplary embodiment, until the injection points 18 respectively face the screen moulds in this case as well. FIG. 1c shows the state after injecting the third screen 23, 24, 25 and 26, respectively.

After injecting the respective fourth screen, the shank is once more displaced in the arrow direction 16 through the distance 17 between two screens to inject the respective subsequent fifth screen.

FIG. 1d shows the already-produced four composite insulators 27, 28, 29 and 30 linked together by the shank 1. Each of the four composite insulators respectively has five screens S, which are all at the same distance 17 from one another. The arrows 31 are intended to indicate that the already finished, but still linked together, composite insulators 27 to 30 have been transported out of the region of the screen moulds. Using cutting tools (not shown here), the shank 1 is cut at the cutting positions 32, so as to obtain four composite insulators 27, 28, 29 and 30 with the same length and the same number of screens S, the screens S respectively having the same spacing 17.

By inserting a new shank into the four screen moulds, it is possible to produce the next four composite insulators simultaneously. The inventive arrangement of the screen moulds affords the opportunity to change the screen moulds so that, for example, it is possible to inject screens with a larger or smaller screen diameter or a different configuration.

It is, moreover, also possible to use four injection moulds for screens which have both different dimensions and a different configuration, for example contours on the underside. It is furthermore possible to vary the spacings of the screens by changing the forward feed 16.

As can be seen from this, composite insulators with an individual number of screens with a different diameter, a different configuration and at a different distance from one another, can even be produced simultaneously in successive injection cycles, by arranging a plurality of injection moulds for screens one behind the other.

FIG. 2 likewise shows a schematic representation of a further exemplary embodiment of a device 40 for producing composite insulators. In this device, the screen moulds are not spatially fixed, but instead are successively placed on the shank to inject the screens and move during each forward feed of the shank during curing of the screens until they are released.

The shank 41 is inserted into the device 40 by a forward-feed apparatus 42 by means of the two drive rollers 43 pressing on it, as indicated by the arrows 44. To control the forward feed 45 of the shank 41, a length meter 46 is provided, a sensing wheel 47 of which presses on the surface of the shank 41. Before injecting the screens, the shank 41 is provided in an apparatus 48 with a vulcanised coat, a cover, which consists of the same material or a comparable material as the one from which the screens are moulded.

To improve the bondability of the screens on the shank 41, the coat applied in the apparatus 48 may be mechanically pretreated on the shank, for example roughened by brushes. In addition to the mechanical pretreatment, or instead of it, it is possible to apply an adhesion promoter. The pretreatment is carried out in the apparatus 49.

The production of the composite insulators may take place fully automatically, the method procedures in the individual apparatus being matched to one another by means of a control apparatus 50 The individual apparatuses assigned to the device 40 for producing the composite insulators are connected via signal and control lines 51 to the control apparatus 50. Via the forward-feed apparatus 42, the latter controls the speed of passage through the device 40, which is matched to the injection of the screens. The application of the cover and its vulcanisation in the apparatus 48 and the pretreatment, application of the adhesion promoter, in the apparatus 49 are furthermore controlled as a function of the speed of passage of the shank 41. The distance between the screens and the length of the respective insulators are established with the aid of the information from the length meter 46.

The device 40 comprises a sizeable number of screen moulds 52, 53 for injecting the screens 54. As indicated here by the screen moulds 52 and 53, corresponding moulds may be provided for moulding screens of different size. For better release of the screens 54, the screen moulds 52 and 53 are divided in a plane 55 perpendicular to the mid-line 56 of the shank 41 and in a plane 57 which is perpendicular thereto and passes through the mid-line 56. The plane 57 therefore divides the screen moulds 52, 53 into two halves with the parts 58a and 58b and with the parts 59a and 59b. The plane 55 in turn divides these two screen-mould halves into respectively a part 58a and 59a, which together form the top of the screen 54, as well as respectively a part 58b and 59b, which together form the underside of the screen 54. Each of these parts 58a and 58b as well as 59a and 59b is installed in one of the holding devices 60a and 60b, respectively, which are arranged on an endless chain 61 and 62, respectively. The two chains 61 and 62 lie on the right and on the left parallel to the shank 41. On the side facing the shank 41, they form together with the screen moulds the moulding section F. The chain 61 is guided over the drive wheel 63 and the return wheel 64. The chain 62 is guided around the drive wheel 65 and the return wheel 66. The drive 67 of the drive wheel 63 and the drive 68 of the drive wheel 65 run synchronously with the same rotational speed. The two chains 61 and 62 therefore move at the same speed, which is matched to the forward feed of the shank 41. The drive wheel 63 rotates clockwise, as indicated by the arrow 69, whereas the drive wheel 65 rotates anticlockwise, as indicated by the arrow 70.

On the other sides of the chains 61 and 62 from the moulding section F, the freely accessible parts 58a and 58b as well as 59a and 59b of the halves of the screen moulds can be changed. The screen moulds are shown here in the open setting after releasing the screens. The distance of the holding devices 60a and 60b from one another can be adjusted in such a way that release of the screens is possible irrespective of their thickness and configuration. To adjust the distance of the screens from one another, the respectively associated holding devices 60a and 60b can be displaced with respect to the neighbouring holding devices 60a and 60b on the chains, as indicated with the aid of the double arrow 71.

The injection of the screens onto the shank to produce a composite insulator is carried out as described below on the device according to the invention:

On both chains 61 and 62, the parts 58a and 58b as well as 59a and 59b of the screen-mould halves are arranged at a distance from one another in the holding devices 60a and 60b in the region of the chains away from the shank 41. The distance between two screens is the distance between two neighbouring partition planes 55 by which respectively the top of the screen moulds, composed of the parts 58a and 59*a*, is divided from the bottom of the screen moulds, composed of the parts 58*b* and 59*b*. This distance is denoted by 72 in the present exemplary embodiment.

While the shank 41 is being displaced in the forward-feed direction 45 by the forward-feed apparatus 42 into the device 40, the return wheels 64 and 66 rotate relative to one another in the arrow directions 73 and 74, respectively, and transport the parts 58*a* and 58*b* of a screen-mould half on the chain 61, and the parts 59*a* and 59*b* of a screen-mould half on the chain 62, respectively from the other side from the shank 41 in the direction of the shank. From the point where the chain 61 and the chain 62 run parallel to the shank 41, at the beginning of the moulding section F, the part 58*a* encounters the part 59*a*. The two together form the top of the screen 54. The part 58*b* encounters the part 59*b* and the two together form the bottom of the screen. The screen mould 52 is still open in the plane 55. So that the screen can be injected, the screen mould 52 is closed by bringing together the parts of the screen-mould halves, as symbolised by the arrows 75 and 76 pointing towards one another, respectively.

As soon as one of the screen moulds has been closed, in the present case the screen mould 52, it is connected to an injection-moulding apparatus. For this purpose, the parts 59*a* of the screen-mould half on the chain 62 respectively have a filler opening 77. When a screen mould, here 52, has been put around the shank 41 and fully closed, an injection-moulding machine 78 is connected to the filler opening 77 in order to force the material for the screen to be injected into the screen mould 52. In the present exemplary embodiment, this is indicated by a connection tube 79. After filling the screen mould 52, the connection tube 79 of the injection-moulding machine 78 is detached from the screen mould 52 and the screen mould moves though one screen spacing 72 further in the forward-feed direction 45. In this case, the subsequent screen mould which is still in the open position lies around the shank 41 and is likewise closed, as indicated by the arrows 75 and 76 pointing towards one another.

In the present exemplary embodiment, there are six closed screen moulds 52 in the device 40. There is a gap between respectively three closed screen moulds, the size of which is here double the screen spacing 72. The holding devices 60*a* and 60*b* at the position 80 are not occupied by a screen mould, because the shank 41 is intended to be cut at the position 80 in order to separate a completed composite insulator 81 After releasing the screens 54 in the three closed screen moulds 52 lying before the position 80, as viewed in the forward-feed direction, a new composite insulator 81 is produced. This new composite insulator 81 is separated at the position 80 by means of a cutting apparatus 82, which is placed downstream of the device 40. As instructed by the control apparatus 50, the cutting apparatus 82 is placed on the shank 41, and cuts off the completed composite insulator 81 with its cutting tool 83. The cutting apparatus 82 is then taken away. The placement and retraction movement of the cutting apparatus 82 is indicated by the double arrow 84. In the present exemplary embodiment, a completed composite insulator 85 (only partly shown) has already been separated from the shank 41 by the cutting apparatus 82.

During the transport of the closed screen moulds by means of the chains 61 and 62 through the moulding section F, the injected screens cool in the screen moulds. The screens are released automatically in the region of the drive wheels 63 and 65. Once a screen mould has reached the plane 86 that forms the end of the moulding section F and in which the chains 61 and 62 are diverted out of their parallel path by the drive wheels 63 and 65, the holding devices 60*a* and 60*b* are respectively pushed apart from one another, as indicated by the double arrows 87 and 88. In this case, the parts 58*b* and 59*b* lift off from the screen bottom 89 and the parts 58*a* and 59*a* lift off from the screen top 90. A new screen 54 is then released.

During further transport of the parts 58*a* and 58*b* as well as 59*a* and 59*b* of the screen-mould halves by the diverted chains 61 and 62, respectively, the screen-mould halves may hit the screens in the event of a corresponding diameter and small spacing of the screens. In this case, provision is made for the parts 58*a* and 58*b* as well as 59*a* and 59*b* of the screen-mould halves to be tilted sideways by 90° out of the transport direction 45, as indicated by the arrows 91 and 92. The respectively tilted parts of the screen-mould halves are denoted by 58*ak* and 58*bk* as well as 59*ak* and 59*bk*. The tilting may, for example, be obtained by a forced mechanical movement, which is not shown here but is known from the prior art.

When the parts of the screen-mould halves have been transported out of the collision region with the screens, for example after a quarter turn of the drive wheels 63 and 65, they are tilted back into their original setting perpendicular to the chains 61 and 62, respectively, as indicated by arrows 93 and 94, respectively.

On the other side of the chains 61 and 62 from the shank 41, it is possible to change the screen moulds and, furthermore, to change their distance from one another in order to change the screen spacing. In the present exemplary embodiment, such changing of the screen moulds is symbolised by the arrows 95 and 96 as well as 97 and 98. In the present exemplary embodiment, the screen moulds 52 are changed for the screen moulds 53 for screens with a larger screen diameter. For this purpose, as indicated by arrows 95 and 96, the parts 58*a* and 58*b* as well as 59*a* and 59*b* of the screen-mould halves are detached from the holding devices 60*a* and 60*h*, respectively. The parts 58*a* and 58*b* as well as 59*a* and 59*b* of the screen moulds 53 intended in the present exemplary embodiment for screens with a larger diameter are then put into the respective holding devices, as indicated by the arrows 97 and 98, respectively. The spacing of the screens is changed by changing the distance of the holding-device pairs 60*a* and 60*b* from one another, as indicated by the double arrow 71. Since the moulds are changed in the open state in the present exemplary embodiment, the spacing 72 of the screens is determined by the distance of the respective mid-points of the holding devices 60*a* and 60*b* from one another.

Since the screen moulds 53 are intended for screens with a larger diameter, the distance of the chains 61 and 62 from the shank 41 also needs to be increased. This distance change can be carried out once all the screen moulds 52 with the smaller screen diameter have passed through the moulding section F. Before the holding devices are put into the moulding section F after having been equipped with the new screen moulds, a preparatory pass of the chains 61 and 62 into the moulding section F is initially provided without screen moulds. The chain distance from the shank 41 can then be adjusted to the new mould size. The two chains 61 and 62 are moved apart, by retracting the drive and return wheels to matching distances from the shank 41, until the parts of the screen-mould halves are assembled to form a closed screen mould 53, the screen mould for screens with a larger screen diameter. When using screen moulds for screens with a smaller diameter, the chains 61 and 62 correspondingly need to be brought closer to the shank 41. In this case, a preparatory pass through the moulding section F without moulds is unnecessary. The adjustment possibilities of the chains 61 and 62 are symbolised by the double arrows 99 and 100.

Within certain limits of the screen diameter, it is unnecessary to change the distance of the chains 61 and 62 from the shank 41, if the screen moulds have a uniform size and only the recess in the respective parts of the screen-mould halves, which is necessary for releasing the screen, is matched to the screen diameters. It is, for example, possible with this apparatus for screens with a different screen diameter to be injected onto the same shank.

Otherwise, screens of different shape can be injected onto the same composite insulator owing to the available changeability of the screen moulds. For instance, it is possible to form the screen bottoms of screens on the same insulator both with and without contours for lengthening the creep path on the underside.

Instead of respectively filling just one screen mould after closure, it is furthermore possible to let a plurality of screen moulds enter the moulding section F before then filling them simultaneously. The length of the moulding section F and the capacity of the injection-moulding machine are the determining factor in this respect. If need be, a number of injection-moulding machines corresponding to the moulds to be filled should be provided for such an exemplary embodiment.

The invention claimed is:

1. A method for the manufacture of composite insulators, consisting of a shank in the form of a rod or tube coated with a cover, which has screens spaced apart from one another, the cover and screens being made from a material having high insulating properties, and wherein for the injection of the screens at least two injection molds for making screens, two screen molds, are placed vertically on the shank, wherein the screen molds are set spaced apart from one another such that screens for at least one composite insulators is injection molded onto one shank whose length has at least the length of the number of the composite insulators to be made, wherein during the manufacture of the composite insulators, after each procedure of the injection of screens, the screen molds are exchanged in regard to their number, configuration and size and adjusted in spacing from one another, wherein the advancing of the shank or the displacement of the screen molds after each procedure of the injection of screens are varied in order to produce different screen spacings, and wherein for the injection of following screens, the shank with the screens already injected is displaced with respect to the screen molds or the screen molds in relation to the shank depending on the screen spacing to such an extent that the screen molds are each addressed to the shank in the positions in each case where the following screens are to be injected onto the shank.

2. The method according to claim 1, wherein the exchanges are made individually or in combination with one another.

3. The method according to claim 2, wherein the screen molds are fed simultaneously and the screens are injected simultaneously.

4. The method according to claim 2, wherein the screen molds are fed successively or randomly in time to the shank.

5. The method according to claim 1, wherein the screen molds are fed simultaneously and the screens are injected simultaneously.

6. The method according to claim 1, wherein the screen molds are fed successively or randomly in time to the shank.

7. The method according to claim 1, wherein for the production of a plurality of composite insulators each time at approximate intervals of the length of a composite insulator, at least one screen mold is disposed, whereby one screen of a composite insulator is simultaneously is injected on the shank, having a continuous length which corresponds to the number of the composite insulators to be produced, and that after the injection of the last screen the shank is severed each time corresponding to the length of a composite insulator.

8. The method according to claim 1, wherein the shank is coated with a cover of an HTV silicone before the injection of the screens.

9. The method according to claim 8, wherein the cover is pretreated prior to the injection of the screens.

10. The method according to claim 9, wherein the cover is roughened.

11. The method according to claim 10, wherein the roughening pretreatment is combined with a pretreatment of coating with a coupling agent combined.

12. The method according to claim 9, wherein the material is coated with a coupling agent.

13. The method of claim 12, wherein the coupling agent is a silane.

14. The method according to claim 12, wherein the coating pretreatment is combined with a pretreatment of roughening the cover.

15. The method according to claim 1, wherein an HTV silicone is used as material of the shields.

16. The method according to claim 1, wherein screens of different materials are injected onto the same shank.

17. An apparatus for producing composite insulators comprising a shank in the form of a rod or tube which is coated with a mantle and which has screens, while at least two injection molds, screen molds, are disposed for the injection of screens, which are brought to the shank and are to be opened for the a final shaping of the screens, wherein screen forms are spaced apart from one another such that the screens are simultaneously injectable for at least one composite insulator wherein during the production of the composite insulators the screen molds are exchangeable in number, configuration and size and the spacing of the screen molds is adjustable, and wherein an advancing system is provided for the displacement of the shank or of the screen molds, and wherein after every displacement of the shank or screen molds, one screen mold lies opposite the position on the shank at which the injection of a screen is provided.

18. An apparatus according to claim 17, wherein the exchanges are made singly or in combination with one another.

19. An apparatus according to claim 17, wherein the screen molds are applied to the shank simultaneously.

20. An apparatus according to claim 17, wherein the screen molds are applied to the shank successively or in any desired succession in time.

21. An apparatus according to claim 20, wherein for the production of a plurality of composite insulators, at least one screen mold is disposed approximately at a distance of the length of one composite insulator, tat with these screen molds, one screen of a composite insulator is injected on the shank, that the shank has a continuous length, which corresponds at least to the length of the number of composite insulators to be made simultaneously, and that between the last screen of a composite insulator and the first screen of the succeeding composite insulator the shank has a position for severance.

22. An apparatus according to claim 20, wherein for the continuous production of composite insulators, a plurality of screen molds disposed one behind the other is provided, that the screen molds are divided into screen mold halves, that the screw mold halves are arranged in each case on an endless, circulating chain, that the one chain is arranged on the shank on the left, as seen in the direction of advancement, parallel to the center line of the shank, that the chains in this arrangement form the mold line in which the screen molds are closed surrounding the shank for the injection of the screens, that the plane of division of the screen mold halves passes through the center line of the shank, that the chains and the shank guided to the mold line migrate though the mold line at the same speed of advancement, that the screen mold halves are brought by means of the chains to the mold line to farm the closed screen molds and are transported away to remove the screens fom the molds, and that an injection molding machine is connected to the closed screen molds in the mold length to inject the screens.

23. An apparatus according to claim 22, wherein the spacing of the screens is adjusted by shifting the screen mold halves on the particular chains.

24. An apparatus according to claim 23, wherein the exchanges are made individually or in combination with one another.

25. An apparatus according to claim 24, wherein the exchanges are carried out during the injection of the screens on the side of the chains that face away from the shank.

26. An apparatus according to claim 22, wherein the parts of the screen meld halves are disposed exchangeably on the side of the chains that faces away from the shank.

27. An apparatus according to claim 26, wherein on the side of the chains that faces away from the shank the number of screen molds is adjustable.

28. An apparatus according to claim 26, wherein on the side of the chains that faces away from the shank the screen molds are exchangeable in regard to size and/or shape of the screens.

29. An apparatus according to claim 28, wherein the distance of the chains from the shank is variable with reference to the size of the screen molds in case of varying screen diameter.

30. An apparatus according to claim 20, wherein the screen mold halves themselves are divisible into their parts in a plane perpendicular to the center line of the shank, and these parts are ranged for displacement in the direction of the center line on the particular chains for the closing of the screen molds for the injection of the screens and for opening of the screen molds to remove the screens from the molds.

31. An apparatus according to claim 17, wherein a system is provided for the preliminary treatment of the cover of the shank by roughening and/or applying an adhesive before the screens are injected.

32. An apparatus according to claim 17 wherein a system is provided for the separation of the finished composite insulators at the positions provided on the shank.

* * * * *